United States Patent [19]

Bauer et al.

[11] 4,107,266

[45] Aug. 15, 1978

[54] PRODUCTION OF PURE ALUMINA FROM IRON CONTAMINATED SULFATE LIQUORS

[75] Inventors: Donald J. Bauer, Reno; Judith A. Eisele, Verdi, both of Nev.

[73] Assignee: The United States of America as represented by the Secretary of the Interior, Washington, D.C.

[21] Appl. No.: 818,045

[22] Filed: Jul. 22, 1977

[51] Int. Cl.² .............................. C01F 7/00; C01F 7/30
[52] U.S. Cl. ..................................... 423/112; 423/126; 423/139; 75/101 BE
[58] Field of Search ....................... 423/112, 126, 139; 75/101 BE

[56] References Cited

U.S. PATENT DOCUMENTS

| | | | |
|---|---|---|---|
| 3,082,062 | 3/1963 | Preuss ................................. | 423/112 |
| 3,323,865 | 6/1967 | Michener et al. .................... | 423/112 |
| 3,331,662 | 7/1967 | Feller .................................. | 423/112 |
| 3,862,293 | 1/1975 | Maurel et al. ....................... | 423/126 |

FOREIGN PATENT DOCUMENTS

| | | | |
|---|---|---|---|
| 475,166 | 8/1969 | Switzerland ........................... | 423/126 |
| 982,098 | 2/1965 | United Kingdom ..................... | 423/112 |

*Primary Examiner*—Herbert T. Carter
*Attorney, Agent, or Firm*—William S. Brown; Donald A. Gardiner

[57] ABSTRACT

Alumina is recovered from aluminum sulfate leach liquors by treatment of the liquor with HCl gas to the point of incipient crystallization of $AlCl_3.6H_2O$, extraction of the resulting solution with a tertiary amine to remove iron, further treatment with HHl gas to precipitate $AlCl_3.6H_2O$ and roasting of the $AlCl_3.6H_2O$ to $Al_2O_3$.

5 Claims, No Drawings

PRODUCTION OF PURE ALUMINA FROM IRON CONTAMINATED SULFATE LIQUORS

The leaching of calcined clay with various mineral acids to dissolve the aluminum content is well known. It is also known in the prior art to leach uncalcined material with hot concentrated sulfuric acid. The aluminum may then be separated from the sulfuric acid leach liquor, which also contains iron and other impurities, by sparging with HCl gas, causing $AlCl_3 \cdot 6H_2O$ to crystallize. Impurities present in the mother liquor may be entrained in the $AlCl_3 \cdot 6H_2O$ crystals, or they may be present as a surface film on the crystals, in which case they can be removed by washing. In order to obtain a high degree of purity, especially from iron, dissolution of $AlCl_3 \cdot 6H_2O$ crystals and recrystallization is necessary. The purified $AlCl_3 \cdot 6H_2O$ is roasted to $Al_2O_3$ and HCl.

It is also known in the prior art to purify acid aluminum leach liquors from their iron contamination by solvent extraction of the iron. This is generally done by using a tertiary amine to extract iron from chloride liquors or a primary amine to extract iron from sulfate liquors. Iron extraction using a tertiary amine has advantages over using a primary amine, e.g., the extractant can be loaded to a higher iron level and phase separation is better in a shorter time. However, a tertiary amine will not extract iron from a sulfate solution since the iron must be in the form of an anionic complex, such as $FeCl_4^-$, in order to be extracted by the tertiary amine.

It has now been found, according to the invention, that alumina of a high degree of purity, particularly with respect to iron, may be obtained by means of a process comprising (1) treatment of an aluminum sulfate leach liquor with HCl gas to the point of incipient crystallization of aluminum chloride hexahydrate, i.e., to the point where further addition of the HCl gas would result in crystallization of $AlCl_3 \cdot 6H_2O$, whereby iron in the solution is converted to an anionic chloride complex, (2) extraction of the resulting solution with a tertiary amine to remove the iron, (3) further addition of HCl gas to precipitate $AlCl_3 \cdot 6H_2O$, and (4) roasting of the $AlCl_3 \cdot 6H_2O$ to $Al_2O_3$.

The feed solution in the process of the invention consists of an iron-contaminated aluminum sulfate solution obtained by leaching an aluminum-bearing material with sulfuric acid according to conventional procedures. Such procedures typically consist of leaching an aluminum-bearing material such as clay with hot concentrated sulfuric acid, or leaching of calcined clay with concentrated sulfuric acid. The resulting solutions typically contain aluminum in an amount of about 10 g/l to 60 g/l and iron in an amount of about 0.5 g/l to 5 g/l.

Preferably, the feed solution is initially treated with an oxidizing agent to ensure complete oxidation of the iron to the ferric state. The preferred oxidizing agent is hydrogen peroxide, but other oxidizing agents such as chlorine or oxygen may be employed. Suitable amounts of oxidizing agent will obviously depend on the specific oxidant employed, and the amount of iron in solution. Generally, about 0.001 to .05 moles of $H_2O_2$ per liter of feed solution is sufficient to completely oxidize the iron.

Gaseous HCl is then added to the feed solution, at ambient conditions of temperature and pressure, by any conventional means such as sparging. Addition of the HCl is continued to the point of incipient crystallization of $AlCl_3 \cdot 6H_2O$, where substantially all of the iron contaminant is converted to an anionic complex, predominantly $FeCl_4^-$. Optimum amounts of gaseous HCl will depend on the specific concentrations of aluminum and iron in the feed solution, as well as other specific conditions, such as temperature, pressure, and pH that may effect the solubility of the $AlCl_3 \cdot 6H_2O$. Accordingly, the optimum amount is usually best determined empirically. However, a range of about 0.04 to 0.4 moles of gaseous HCl per liter of feed solution is generally suitable.

The HCl-treated feed solution is then extracted with a tertiary amine to remove the iron from the aqueous phase. The preferred tertiary amines are aliphatic tertiary amines having chain lengths of about 12 to 18 carbons. These are generally employed in solution in an inert solvent such as kerosene, benzene, or toluene, the concentration of the amine being about 5 to 20 percent by volume of the solution. A co-solvent consisting of an aliphatic alcohol having a chain length of about 8 to 10 carbons may also be included in the extractant solution in order to improve extraction efficiency and prevent formation of a third phase during the extraction procedure. Suitable concentrations of the co-solvent in the extractant solution will generally be about 5 to 15 percent by volume.

The extraction procedure, i.e., contacting of the HCl-treated feed solution and the extractant solution, and subsequent separation of raffinate and iron-loaded extractant phases, may be by means of any conventional batch or continuous process. The optimum amount of extractant employed may vary considerably depending on the concentration of iron in the feed solution, type of extraction procedure, etc. However, volume ratios of extractant solution to feed solution will generally be in the range of about 1:1 to 1:5.

The raffinate is then treated, as by sparging, with gaseous HCl at ambient conditions of temperature and pressure in order to crystallize high purity $AlCl_3 \cdot 6H_2O$ from the solution. The gaseous HCl is added in an amount sufficient to effect substantially complete precipitation of aluminum as $AlCl_3 \cdot 6H_2O$, which may then be roasted to $Al_2O_3$ by conventional procedures at a temperature of about 1000° C.

The process of the invention will be more specifically illustrated by the following example:

EXAMPLE

A sulfate leach liquor was produced by leaching calcined clay with 50 vol-pct $H_2SO_4$. The filtered liquor, which contained 48 g/l Al and 1.37 g/l Fe, was reacted with a small amount of $H_2O_2$ to insure complete oxidation of the iron. The liquor was then sparged with HCl gas to the point of incipient crystallization. The resulting solution was contacted with one-third its volume of a mixture of 15 vol-pct Alamine 336 (a commercially available long chain tertiary aliphatic amine), 5 vol-pct decyl alcohol and 80 vol-pct kerosene. The iron content of the raffinate was 0.01 g/l. Sparging of the raffinate with HCl gas resulted in crystallization of high purity $AlCl_3 \cdot 6H_2O$.

We claim:

1. A process for recovery of alumina from iron contaminated aluminum sulfate leach liquors comprising (1) treating the liquor with hydrogen chloride to the point of incipient crystallization of aluminum chloride hexahydrate whereby the iron contaminant is converted to an anionic complex, $FeCl_4^-$, (2) extracting the resulting solution with an extractant comprising a tertiary amine to yield a raffinate of low iron content, (3) treating the raffinate with hydrogen chloride to crystallize and precipitate aluminum chloride hexahydrate, and (4) roasting the aluminum chloride hexahydrate to alumina.

2. The process of claim 1 in which the extractant comprises a tertiary amine in solution in an inert solvent.

3. The process of claim 2 in which the extractant also contains a co-solvent consisting of a long-chain aliphatic alcohol.

4. The process of claim 3 in which the alcohol is decyl alcohol.

5. The process of claim 1 in which the tertiary amine is an aliphatic tertiary amine having chain lengths of about 12 to 18 carbons.

* * * * *